(No Model.)

E. J. WITTEBOLLE.
MUSIC LEAF TURNER.

No. 417,696. Patented Dec. 17, 1889.

WITNESSES:
Chas. A. Mahony
F. L. Morster

INVENTOR
Emile J. Witebolle
by his attorney
Chas. A. Rutter

UNITED STATES PATENT OFFICE.

EMILE J. WITTEBOLLE, OF CAMDEN, NEW JERSEY, ASSIGNOR TO JOHN J. BOYLE, OF PHILADELPHIA, PENNSYLVANIA.

MUSIC-LEAF TURNER.

SPECIFICATION forming part of Letters Patent No. 417,696, dated December 17, 1889.

Application filed February 28, 1889. Serial No. 301,512. (No model.)

*To all whom it may concern:*

Be it known that I, EMILE J. WITTEBOLLE, a citizen of the Republic of France, and a resident of the city and county of Camden, and State of New Jersey, have invented certain new and useful Improvements in Music-Leaf Turners, of which the following is a specification.

My invention relates to improvements in that class of machines called "music-leaf turners," the object of which is to automatically turn the leaves of music-books or sheet-music while playing at the piano or other musical instrument, and the object of my invention is to furnish a music-leaf turner which will be simple, inexpensive, and positive in action.

Figure 1:
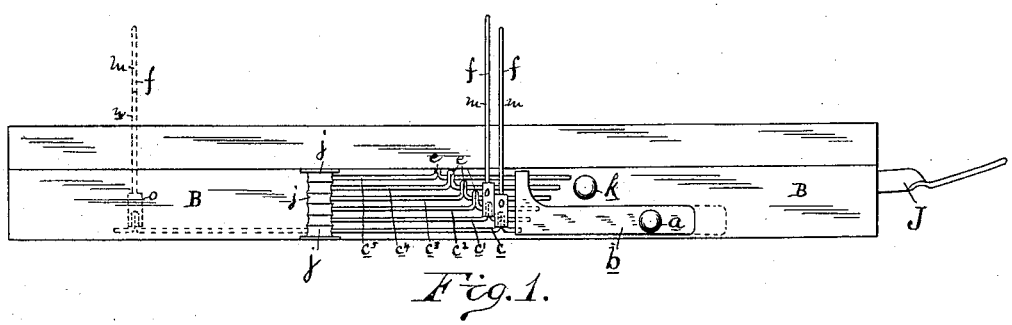
Figure 2:
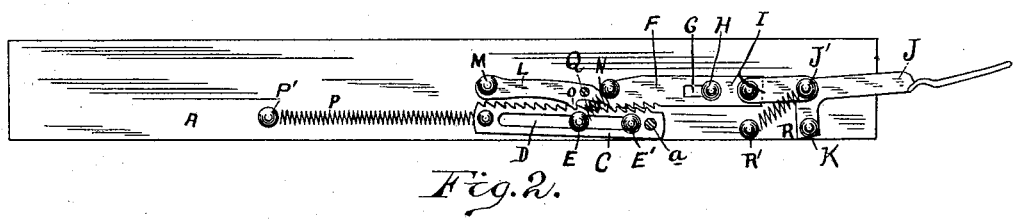
Figure 3:
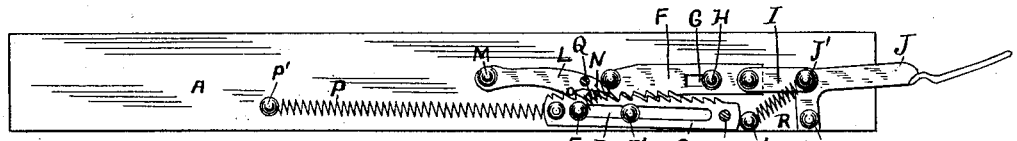
Figure 4:
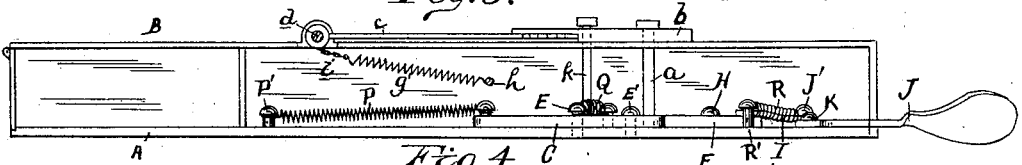
Figure 5:
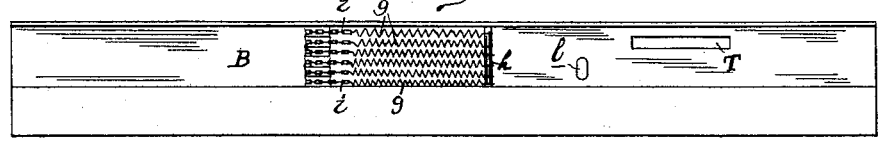
Figure 6:

In the accompanying drawings, forming part of this specification, and in which similar letters of reference indicate similar parts throughout the several views, Figure 1 is a plan of my music-leaf turner; Fig. 2, a plan with the top removed, the finger-releasing mechanism being in its first position; Fig. 3, a plan with the top removed, the finger-releasing mechanism being in its last position; Fig. 4, a side elevation, the top being in section; Fig. 5, a bottom view of the top, and Fig. 6 a sectional elevation of a leaf-turning finger.

A is the base of the instrument; B, the top or cover; C, a rack furnished with a slot D.

E E' are two screws or their equivalent passing through slot D and secured to base A, and which serve to guide the rack C in its movements.

F is a rack furnished with a slot G, through which a screw H passes and is secured to base A. This screw guides the rack F in its movements. To the outer end of rack F one end of a link I is attached, the other end of this link being attached to a bell-crank lever J, which is pivoted at K to the base A.

L is a pawl pivoted at M to base A, and furnished with a projecting nose N, which lies under the inner end of rack F, and with a tooth O, which engages with the teeth of rack C.

P is a spring, one end of which is attached to rack C and the other to a pin or screw P' on base A.

Q is a spring having one end attached to inside end of rack F and the other to screw E.

R is a spring, one end of which is attached to a screw R' on base A and the other to bell-crank J and J'.

$a$ is a rod or screw attached to rack C, and which passes up and through a slot T in the top B, and is secured to a latch $b$.

$c$ $c'$ $c^2$ $c^3$ $c^4$ $c^5$ are arms which are carried on a pivot $d$, which is carried by the top B or by supports carried by this top. These arms are bent up, as shown at $e$, and over this bent-up part the leaf-turning fingers $f$ are placed.

$g$ are springs, one end of which are secured to chains $i$, which are secured to the arms $c$ $c'$, &c., or to the hubs $j$, to which these arms are secured, the other ends being secured to a rod $h$ passing across the top B.

$k$ is a screw or rod, one end of which is secured to pawl L, and which passes up and through the top B through a slot $l$.

The device is operated as follows: As many of the arms $c$ $c'$ $c^2$, &c., as there are leaves of music to be turned are fitted with the fingers $f$, and the leaves are placed between the bifurcated ends of the fingers. The latch $b$ is now in the position shown in Fig. 2. When it is desired to turn the first leaf, the lever J is struck by the hand and depressed, and this, through link I, draws over rack F, which draws over rack C through the space of one tooth, and this rack, through screw $a$, draws latch $b$ over the same distance, releasing the first arm $c$, which, through the spring $g$ and chain $i$, is thrown over into the position shown by the dotted lines, Fig. 1, and with it the leaf which is held by the finger $f$. The second, third, and fourth fingers, &c., are released in the same way, each turning its leaf. The lever J is returned to its original position by spring R, and the rack F and pawl L, the latter of which holds the rack in place after each of the turning-fingers has been released, are thrown into gear with teeth of rack C by the spring Q. After the fingers have been all released and it is desired to return them to their first position—that shown in Fig. 1—the arms are raised by hand and brought back, and the screw $k$ is moved up by the finger, raising pawl L and rack F out of contact with teeth on rack C, when the spring P draws the rack C back to its first position, and through the screw *a* the latch *b* is returned to its first position and holds the arms *c c'*, &c., down.

It will be observed that the fingers *f* are made so that they may be removed from the arms *c c'*, &c., and when it is desired to turn the leaves by hand the fingers may be removed from the arms and the music-book placed, as usual, upon the turning-instrument. The instrument may be built upon the piano, and in this case it would be desirable to have the fingers removable.

The fingers *f* are constructed of two wires *m n*, or of one wire bent over, and are soldered into a socket *o*, which is adapted to be placed over the bent-up part *e* of the arms *c c'*, &c.

Having thus described my invention, I claim—

1. The combination of rack C, pawl L, rack F, link I, lever J, and springs P, Q, and R, screw *a*, latch *b*, and screw *k*, and leaf-turning fingers, all arranged and operating substantially as and for the purposes set forth.

2. The leaf-turning fingers *f*, with bifurcated ends *m n*, and a socket *o*, adapted to be placed over the bent-up portions *e* of the arms *c*, substantially as described.

3. The herein-described device for releasing the rack C and returning the latch *b* to its first position, consisting of the pawl L, with nose N, and screw K and spring P, all arranged and operating substantially as set forth.

EMILE J. WITTEBOLLE.

Witnesses:
JOHN I. GREEN,
CHAS. A. RUTTER.